United States Patent
Muller et al.

(10) Patent No.: US 7,552,399 B2
(45) Date of Patent: Jun. 23, 2009

(54) EXTENSIBLE ICONS WITH MULTIPLE DROP ZONES

(75) Inventors: Michael Muller, Medford, MA (US); Andrew L. Schirmer, Andover, MA (US); Daniel M. Gruen, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 11/318,804

(22) Filed: Dec. 27, 2005

(65) Prior Publication Data

US 2007/0150834 A1 Jun. 28, 2007

(51) Int. Cl.
*G06F 3/048* (2006.01)

(52) U.S. Cl. ...................................... 715/810; 715/835

(58) Field of Classification Search ........................ None
See application file for complete search history.

(56) References Cited

U.S. PATENT DOCUMENTS

| | | | | |
|---|---|---|---|---|
| 6,756,999 B2* | 6/2004 | Stoakley et al. | ............. | 715/779 |
| 2004/0162895 A1* | 8/2004 | Mok et al. | ................. | 709/223 |
| 2005/0022132 A1* | 1/2005 | Herzberg et al. | ............ | 715/759 |
| 2005/0203976 A1* | 9/2005 | Hyun et al. | ................. | 707/204 |
| 2007/0006089 A1* | 1/2007 | Bales et al. | ................. | 715/769 |

OTHER PUBLICATIONS

Microsoft Windows XP; Copyright Date: 2001.*
Wikipedia: Icons (Computer); http://en.wikipedia.org/wiki/Icon_%28computing%29.*
Windows XP Tutorial, Jan. 31, 2002, China.

* cited by examiner

*Primary Examiner*—Doug Hutton
*Assistant Examiner*—Soumya Dasgupta
(74) *Attorney, Agent, or Firm*—Stephen T. Keohane, Esq.; Steven M. Greenberg, Esq.; Carey Rodriguez Greenberg & Paul LLP

(57) ABSTRACT

Embodiments of the present invention address deficiencies of the art in respect to icon management in a GUI and provide a novel and non-obvious method, system and computer program product for extensible icons with multiple drop zones. In one embodiment of the invention, an icon data processing system configured for use in a GUI can include a contracted form of an extensible icon; an expanded form of the extensible icon including multiple drop zones; and, a drag-and-drop event handler coupled to the contracted form of the extensible icon and the expanded form of the extensible icon.

6 Claims, 2 Drawing Sheets

EXTENSIBLE ICONS WITH MULTIPLE DROP ZONES

BACKGROUND OF THE INVENTION

1. Field of the Invention

The present invention relates to the field of user interface controls and more particularly to iconic representations of objects and commands in a graphical user interface (GUI).

2. Description of the Related Art

The conventional graphical user interface (GUI) has been widely used for many years. The primary function of the GUI includes providing user interface controls with which the end user can interact with an underlying application. The common GUI includes many stock user interface controls, most of which, when combined, can accommodate most computer human interactions required by an application. For example, when disposed in a window such as a dialog box, the static text box control can be used to present text to the end user while an edit box can permit the user to provide textual input to the application. A radio button control can provide for the exclusive selection of an element from among a field of elements, while a checklist box can provide for the non exclusive selection of elements from among a field of elements.

An icon is a staple component of the common GUI. The icon is a visual representation of an underlying object or action. Generally, an icon can be either selected or activated. An icon generally can be selected through a single mouse click in proximity to the icon, or through alternative input method means such as a keyboard strike when the icon has focus. Activation, by comparison, generally involves the "double-clicking" of the icon through a mouse or keyboard, although it is well-known to select icons through menu means in addition to a plethora of other operations.

In many operating systems, an icon can be configured to under a particular action through a configuration of the icon to become associated with the action. Likewise, an icon can be merely associated with an object such as a document through a configuration of the icon. In the latter circumstance, it is common to also specify an application and corresponding application operation to be performed when the icon is selected in association with an object. As an example, when an icon is associated with a document, the icon can be configured to open the document using a specified editor when the icon is activated.

Advanced forms of the modern operating system permit drag-and-drop operations for an icon. In a drag-and-drop operation, one object can be applied to another object by selecting and moving the subject object graphically over the target object. When the subject object is in suitable proximity to the target object, the subject object can be released triggering a drag-and-drop event. The target object—in this case an icon—can be pre-configured to process the drag-and-drop event by identifying the subject object and performing a pre-specified action on the subject object. For instance, where the target object is a printer icon and the subject object is a document, the target object can be pre-configured to print the document referenced by the subject object responsive to receiving a drag-and-drop event for the subject object.

Notably, in many circumstances, the target icon need not indicate the pre-specified operation for a drag-and-drop operation for a subject icon because the pre-specified operation will be apparent to the end user such as the printer and document icons example. In other circumstances, however, the pre-specified operation will not be so clear. Rather, in many other circumstances, the context of a series of interactions between the user and the GUI will determine the most logical, pre-specified operation for a drag-and-drop even for a target icon in respect to a subject icon. Yet, the context of a series of interaction can vary from user to user while a target icon can have only a single, pre-specified operation for a drag-and-drop event for a subject icon.

BRIEF SUMMARY OF THE INVENTION

Embodiments of the present invention address deficiencies of the art in respect to icon management in a GUI and provide a novel and non-obvious method, system and computer program product for extensible icons with multiple drop zones. In one embodiment of the invention, an icon data processing system configured for use in a GUI can include a contracted form of an extensible icon; an expanded form of the extensible icon including multiple drop zones; and, a drag-and-drop event handler coupled to the contracted form of the extensible icon and the expanded form of the extensible icon.

The multiple drop zones can include separate iconic elements disposed about the expanded form of the extensible icon, separate subdivided portions of the expanded form of the extensible icon, or separate menu items in a pop-up menu disposed adjacent to the expanded form of the extensible icon, each of the drop zones including an association with a different operation. Moreover, each of the drop zones can include an association with a different drag-and-drop operation, or a different selection operation. Finally, the drag-and-drop event handler can include program code enabled to replace the contracted form of the extensible icon with the expanded form of the extensible icon responsive to a proximity event for the contracted form of the extensible icon.

In another embodiment of the invention, a method for managing an extensible icon in a GUI can include detecting a proximity event for the extensible icon; configuring an expanded form of the extensible icon with multiple drop zones and associating each of the multiple drop zones with a different operation; and, replacing a contracted form of the extensible icon in the GUI with the expanded form of the extensible icon. The method further can include processing a drag-and-drop event for one of the multiple drop zones by performing an associated operation on a subject icon dropped onto the one of the multiple drop zones. Likewise, the method further can include processing a selection event for a selected one of the multiple drop zones by performing an operation associated with the selected one of the multiple drop zones.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for extensible icons with multiple drop zones. In accordance with an embodiment of the present invention, an extensible icon with a multiple drop zone can include two representative states—an expanded state and a contracted state. In the contracted state, the extensible icon can appear as an ordinary icon. In an expanded state, however, the extensible icon can appear larger than an ordinary icon and can include iconic regions each dedicated to a different operation. In this regard, each iconic region can be dedicated to a different operation responsive to a drag-and-drop operation or a selection operation. The expanded state can be activated when a mouse pointer becomes proximate to the extensible icon during a selection or a drag-and-drop operation.

Figure 1A:
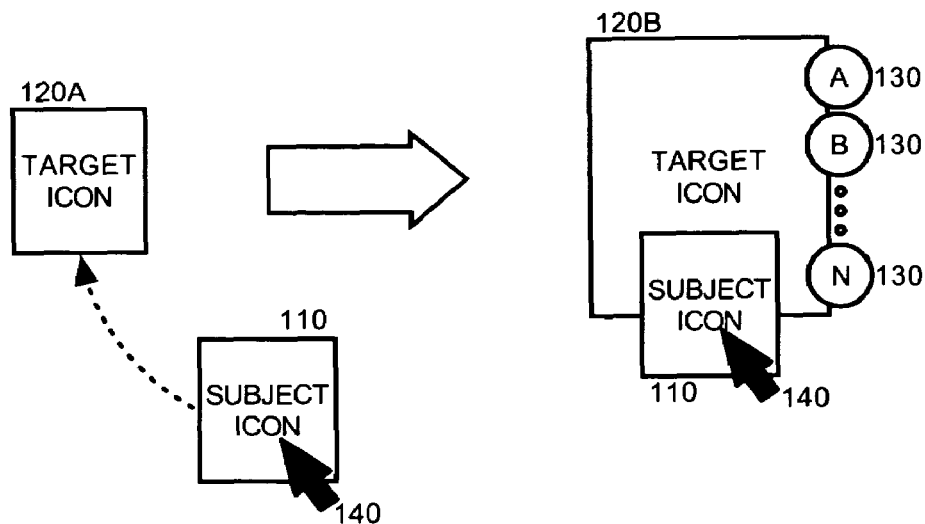
FIG. 1A is a pictorial illustration of a drag-and-drop operation for an extensible icon with multiple drop zones.

In illustration, FIG. 1A depicts a drag-and-drop operation for an extensible icon with multiple drop zones. As shown in FIG. 1A, a drag-and-drop operation can be performed by selecting a subject icon 110 with a pointer 140 and dragging the subject icon 110 into the proximity of the contracted form of the target icon 120A. The target icon 120A, responsive to detecting the proximity of the subject icon 110 can transform to an expanded form of the target icon 120B which can include multiple drop zones 130. Each of the drop zones 130 can represent a different operation to be performed if the subject icon 110 is dropped on the individual ones of the drop zones 130. In this way, the operation to be performed in response to a drag-and-drop operation can vary according to the context of the operation and the target icon 120A, 120B is not limited to a singular operation to be performed in response to a drag-and-drop operation.

Figure 1B:
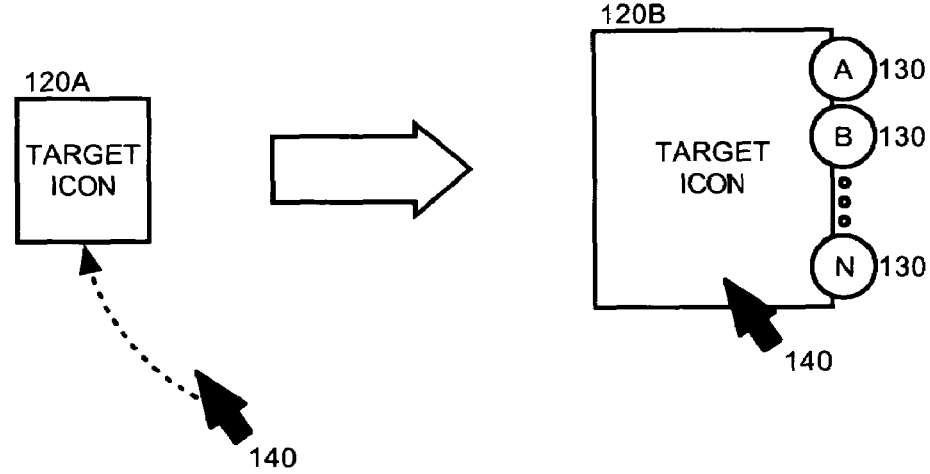
FIG. 1B is a pictorial illustration of a selection operation for an extensible icon with multiple drop zones.

As another example, FIG. 1B is a pictorial illustration of a selection operation for an extensible icon with multiple drop zones. In FIG. 1B, the contracted form of the target icon 120A can detect the proximity of a pointer 140 during a selection operation. When the pointer 140 comes into proximity of the contracted form of the target icon 120A, the target icon 120A can transform into the expanded form of the target icon 120B to reveal the multiple drop zones 130. Once revealed, any of the multiple drop zones 130 can be selected by the pointer 140. Notably, though the pictorial illustration depicts the drop zones as ancillary iconic elements, it is to be understood that the drop zones 130 can be any visually delimited portion of the expanded form of the target icon 120B, including subdivided regions of the expanded form of the target icon 120B, or even a pop-up menu disposed adjacent to the expanded form of the target icon 120B.

Figure 1C:
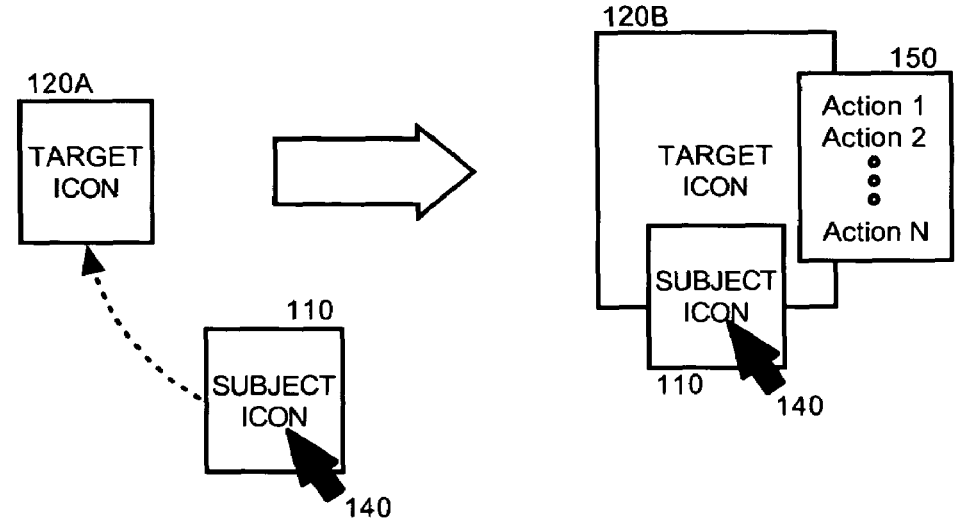
FIG. 1C is a pictorial illustration of a drag-and-drop operation for an extensible icon with a pop-up menu for multiple drop zones.

Specifically, in reference to the latter circumstance, FIG. 1C is a pictorial illustration of a drag-and-drop operation for an extensible icon with a pop-up menu for multiple drop zones. In FIG. 1C, a drag-and-drop operation can be performed by selecting a subject icon 110 with a pointer 140 and dragging the subject icon 110 into the proximity of the contracted form of the target icon 120A. The target icon 120A, responsive to detecting the proximity of the subject icon 110 can transform to an expanded form of the target icon 120B which can include multiple drop zones within a pop-up menu 150. Each of the drop zones can be a menu entry which represents a different operation to be performed if the subject icon 110 is dropped on a singular one of the menu entries in the pop-up menu 150.

Figure 2:
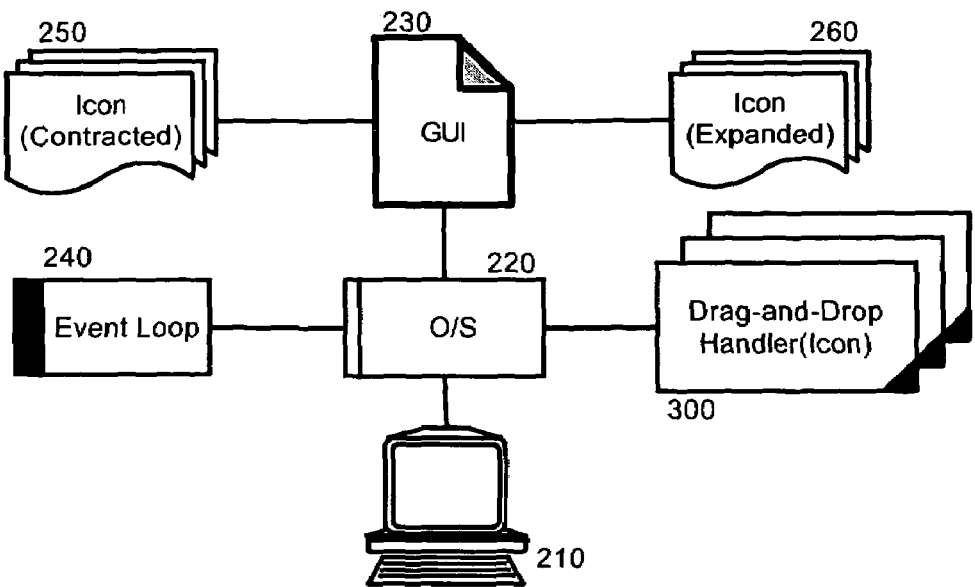
FIG. 2 is a schematic illustration of a data processing system configured for managing extensible icons with multiple drop zones; and, FIG. 3 is a flow chart illustrating a process for managing extensible icons with multiple drop zones in the data processing system of FIG. 2.

The extensible icons shown in FIGS. 1A through 1C can be managed within a data processing system. In this regard, FIG. 2 is a schematic illustration of a data processing system configured for managing extensible icons with multiple drop zones. As shown in FIG. 2, the data processing system can include a host computing platform 210 arranged with a graphical operating system 220. The graphical operating system 220 can be configured to generate a GUI 230 for a hosted application. In this regard, as it is well-known in the art, the operating system 220 can include graphical resources exposed to applications through an application programming interface that can be invoked for display by application logic.

The GUI 230 can be enabled to include extensible icons 250, 260 managed by respective drag-and-drop handlers 300. The drag-and-drop handlers 300 can be communicatively coupled to an event loop 240 for the operating system and can include program code enabled to process several user interface events for the extensible icons 250, 260 in the GUI 230, including proximity events, selection events and drag-and-drop events. In particular, the program code of the drag-and-drop handlers 300 can be enabled to process a proximity event for a contracted form of one of the extensible icons 250 by transforming the contracted form of the extensible icon 250 into an expanded form of the extensible icon 260 including multiple drop zones (not shown).

Figure 3:
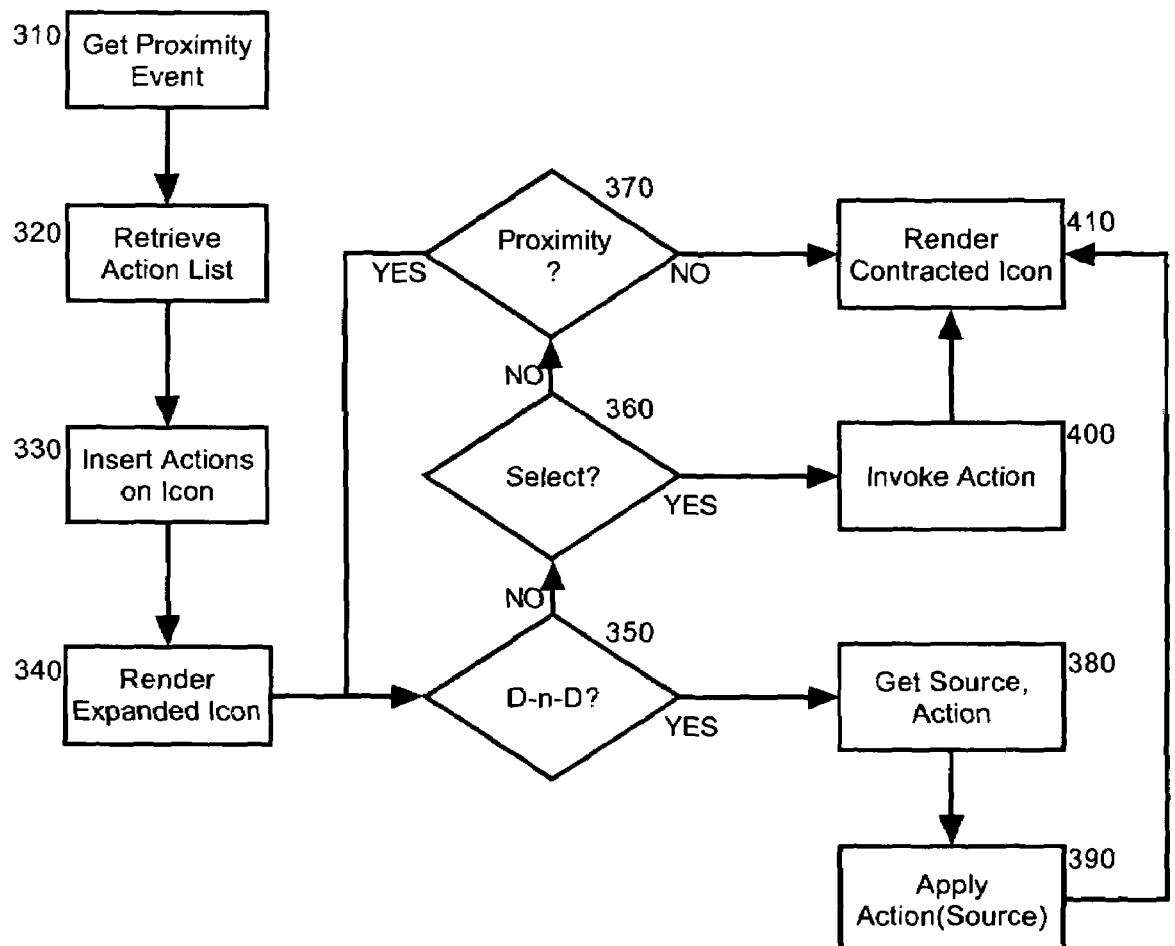

In more particular illustration of the operation of the drag-and-drop handlers 300, FIG. 3 is a flow chart illustrating a process for managing extensible icons with multiple drop zones in the data processing system of FIG. 2. Beginning in block 310, a proximity event can be detected for a contracted form of a target extensible icon with multiple drop zones. In block 320, an action list can be retrieved for the target extensible icon which can include one or operations which can be performed in response to a selection or drag-and-drop operation for the target extensible icon. In block 330, an expanded form of the target extensible icon can be configured with drop zones corresponding to the actions in the list. Subsequently, in block 340, the expanded form of the target extensible icon can be rendered with the multiple drop zones.

In decision block 350, it can be determined whether a drag-and-drop event has been detected for the expanded form of the target extensible icon. If so, in block 380, a source object can be identified for the drag-and-drop operation as can a drop zone associated with the drag-and-drop operation. Subsequently, in block 390 the associated drag-and-drop operation can be applied to the source object. Finally, in block 410, the expanded form of the target extensible icon can be replaced with a contracted form of the target extensible icon.

In block 350 if a drag-and-drop operation is not detected, in decision block 360 it can be determined whether a selection operation has been detected for one of the multiple drop zones for the expanded form of the target extensible icon. If so, in block 400 the selected operation can be performed and in block 410, the expanded form of the target extensible icon can be replaced with a contracted form of the target extensible icon. Finally, in decision block 370, it can be determined whether proximity remains for the expanded form of the target extensible icon. If not, in block 410, the expanded form of the target extensible icon can be replaced with a contracted form of the target extensible icon. Otherwise, the process can repeat through decision block 350.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for managing an extensible icon in a graphical user interface (GUI), the method comprising:
   detecting a proximity event for the extensible icon when the extensible icon is in a contracted form, wherein the extensible icon visually represents underlying operations;
   in response to the detection of the proximity event, displaying an expanded form of the extensible icon with multiple different drop zones in the GUI on a computer monitor, wherein the expanded form has multiple different drop zones;
   associating each of the multiple drop zones in the expanded form with a different operation.

2. The method of claim 1, further comprising processing a drag-and-drop event for one of the multiple drop zones by performing an associated operation on a subject icon dropped onto the one of the multiple drop zones.

3. The method of claim 1, further comprising processing a selection event for a selected one of the multiple drop zones by performing an operation associated with the selected one of the multiple drop zones.

4. The method of claim 1, wherein displaying an expanded form of the extensible icon with multiple drop zones, comprises configuring the expanded form of the extensible icon with separate iconic elements disposed about the expanded form of the extensible icon, each of the drop zones comprising an association with a different operation.

5. The method of claim 1, wherein displaying an expanded form of the extensible icon with multiple drop zones, comprises configuring the expanded form of the extensible icon with separate subdivided portions of the expanded form of the extensible icon, each of the drop zones comprising an association with a different operation.

6. The method of claim 1, wherein displaying an expanded form of the extensible icon with multiple drop zones, comprises configuring the expanded form of the extensible icon with separate menu items in a pop-up menu disposed adjacent to the expanded form of the extensible icon, each of the drop zones comprising an association with a different operation.

* * * * *